E. MECHAU.
ILLUMINATING DEVICE FOR MOVING PICTURE APPARATUS.
APPLICATION FILED MAY 7, 1921.
1,417,089.
Patented May 23, 1922.
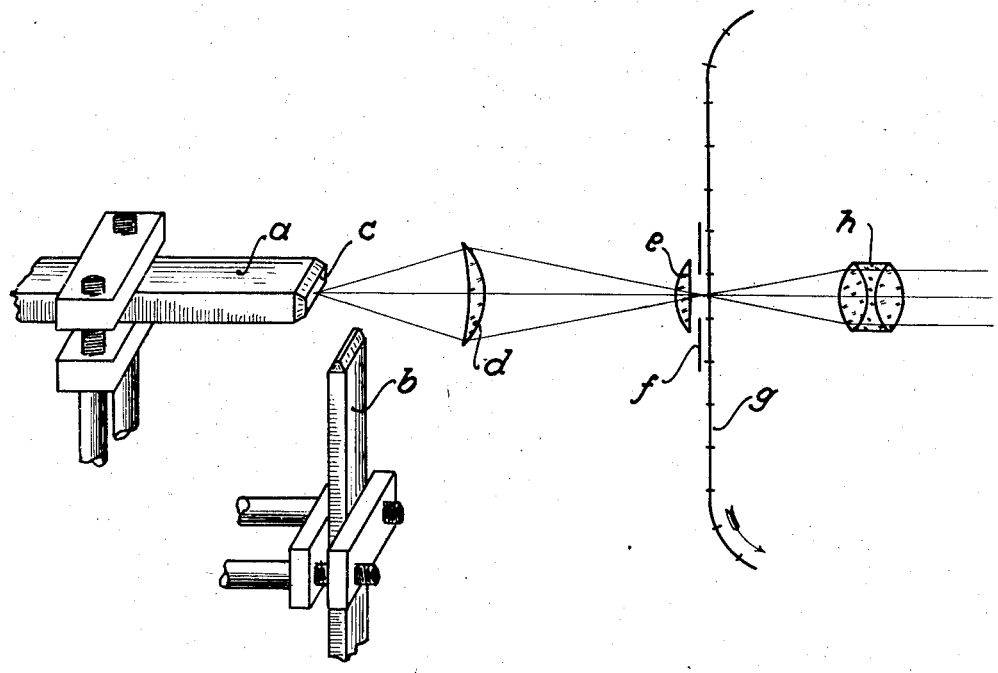

UNITED STATES PATENT OFFICE.

EMIL MECHAU, OF RASTATT, GERMANY.

ILLUMINATING DEVICE FOR MOVING-PICTURE APPARATUS.

1,417,089.　　　　　　Specification of Letters Patent.　　Patented May 23, 1922.

Application filed May 7, 1921. Serial No. 467,588.

*To all whom it may concern:*

Be it known that I, EMIL MECHAU, a citizen of Germany, residing at Rastatt, Germany, have invented an Improvement in Illuminating Device for Moving-Picture Apparatus, and for which I have filed application in Germany, May 6, 1920, of which the following is a specification.

My invention relates to moving picture apparatus with intermittent as well as continuous movement of the picture band. In such apparatus it is essential that pictures of the well known rectangular size are illuminated completely and uniformly during their passage through the projector gate.

Although there have already been employed for this purpose sources of light of a rectangular form, the condensing optical system was always so placed with regard to the source of light that an image of the latter was reproduced at the spot of the projection lens, i. e. within it.

This lens generally having a circular aperture as most lenses in optical apparatus do, evidently its full aperture cannot be utilized by such a method of directing the light rays. In following this method still another disadvantage arises. It is a recognized fact that the sectional form of a beam of light directed by optical means, throughout the whole path or rays except immediately before the spot where the image is produced, is entirely and only dependent on the aperture shape of the lenses or other diaphragms inserted in the path of rays. Therefore, by employing, as usual, condensing lenses of circular aperture the cross-section of the beam of light will be circular in the projector gate also, even if a source of light of rectangular form is employed and reproduced at the spot of the projection lens. As the projector gate is rectangular like the film picture, a loss of light is unavoidable.

It is the object of my present invention to provide simple and reliable means in moving picture apparatus whereby this loss of light can be avoided and a complete and uniform illumination of the pictures to be projected is effected. These means may be employed in combination with various sources of light of rectangular incandescent form already existent or especially constructed for this purpose.

My improved illuminating device involves, generally stated, the employment of a novel arrangement of optical systems which will produce an image of the used rectangular source of light in, or in the neighbourhood of, the projector gate through which the picture band passes. The said optical systems may consist of a collecting lens or of a collecting lens system or of a concave mirror or of a combination of such a mirror with lenses.

If an electric arc lamp constitutes the source of light, as shown in the drawing, a rectangular positive carbon is employed, corresponding to my invention, instead of the hitherto used round one. The incandescent crater will then, of course, not any more be round, but also rectangular. In order to get it of the proper form, it is advisable to use the negative carbon also of a rectangular shape. The cross-section of the positive carbon being of relatively small size it need not be feared that a crater smaller than the cross-section of the carbon would form and change its position from one side to another as the carbon burns away.

In the same manner the incandescent body can be formed rectangular by application of lime light or other illuminants.

A construction of an illuminating device according to my invention is illustrated, by way of example, in the accompanying drawing in which:

$a$ is a positive and $b$ a negative carbon of an electric arc lamp, $c$ is an incandescent crater, in other words the source of light proper. The crater $c$ has, just as the positive carbon $a$, a rectangular form geometrically alike the size of the film-picture. An optical collecting lens system is presented by $d$ which produces an image of the crater $c$ in a rectangular opening of an opaque diaphragm $f$ representing a projector gate of a moving picture apparatus. Near to this diaphragm is arranged on the one side a collecting lens E and on the other side a film $g$. The collecting lens $e$ regulates the path of the rays and directs them to an objective $h$ which projects the rectangularly illuminated picture band on to a projection screen.

I claim as my invention:

1. In an illuminating device for moving picture apparatus in combination, a source of light of rectangular incandescent form and a collecting optical system of suitable focal length so related thereto that the source of light is reproduced in the projector gate of the apparatus.

2. In an illuminating device for moving picture apparatus in combination, a positive carbon of rectangular cross-section of an electric arc lamp and a collecting optical system of suitable focal length so related thereto that the crater of the arc lamp is reproduced in the projector gate of the apparatus.

3. In an illuminating device for moving picture apparatus in combination, a positive and a negative carbon of rectangular cross-section of an electric arc lamp and a collecting optical system of suitable focal length so related thereto that the crater of the arc lamp is reproduced in the projector gate of the apparatus.

EMIL MECHAU.

Witnesses:
FRIEDRICH ENGELMANN,
HERMANN HEINE.